6 Sheets—Sheet 1.

J. A. WOODBURY, J. MERRILL, G. PATTEN, & E. F. WOODBURY.
Air-Engine.

No. 228,716.  Patented June 8, 1880.

Witnesses:
E. A. Hemmenway
Walter C. Lombard

Inventors:
James A. Woodbury,
Joshua Merrill,
George Patten,
Edward F. Woodbury,
by N. C. Lombard
Attorney.

N. PETERS, PHOTO-LITHOGRAPHER, WASHINGTON, D.C.

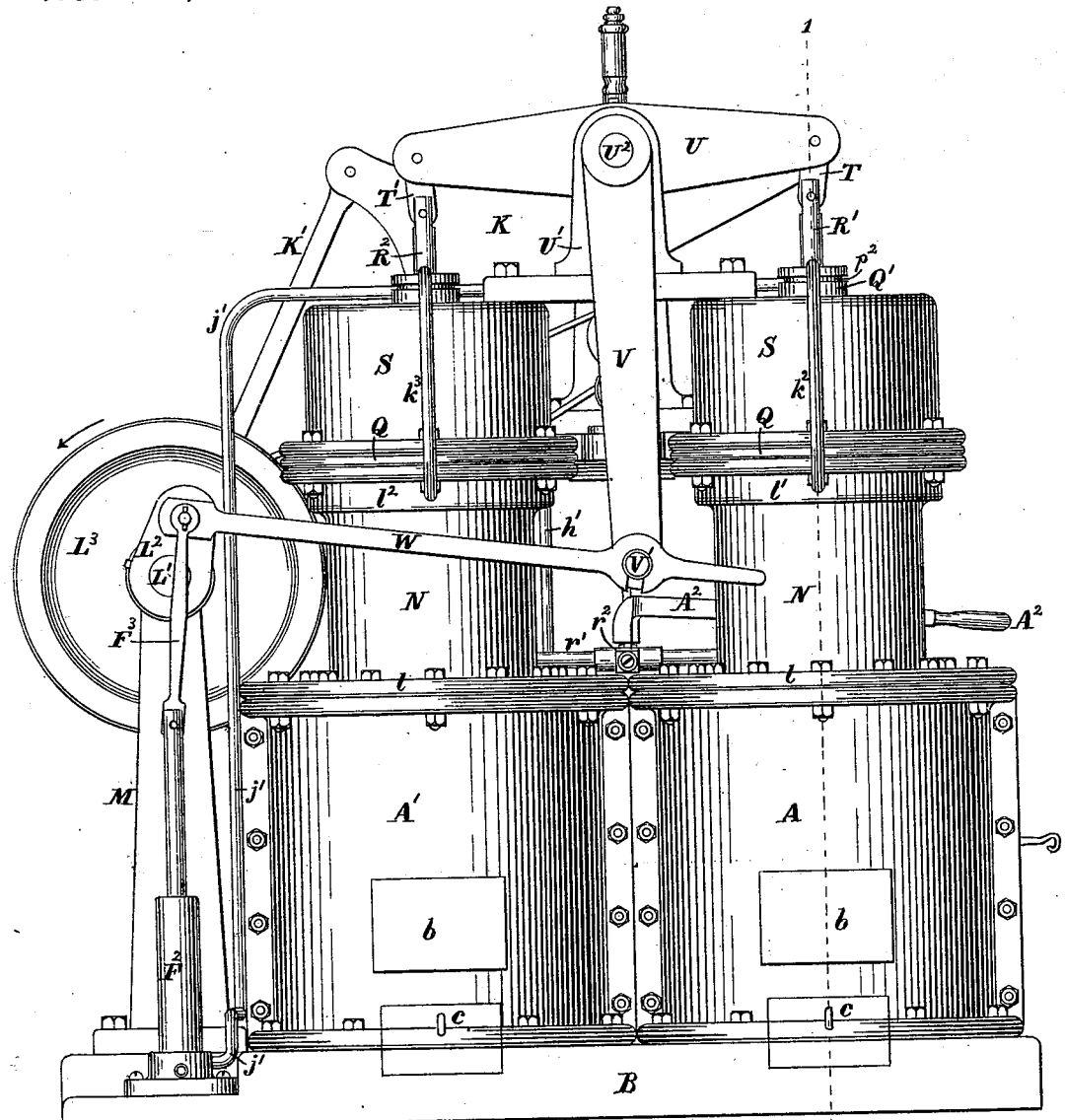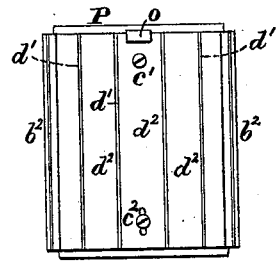

6 Sheets—Sheet 3

J. A. WOODBURY, J. MERRILL, G. PATTEN, & E. F. WOODBURY.
Air-Engine.

No. 228,716.  Patented June 8, 1880.

Witnesses:
E. A. Hemmenway
Walter E. Lombard

Inventors:
James A. Woodbury,
Joshua Merrill,
George Patten,
Edward F. Woodbury,
by N. C. Lombard,
Attorney.

J. A. WOODBURY, J. MERRILL, G. PATTEN, & E. F. WOODBURY.
Air-Engine.

No. 228,716. Patented June 8, 1880.

Witnesses:
E. A. Hemmenway
Walter O. Lombard

Inventors:
James A. Woodbury,
Joshua Merrill,
George Patten,
Edward F. Woodbury,
by N. C. Lombard
Attorney.

6 Sheets—Sheet 6

J. A. WOODBURY, J. MERRILL, G. PATTEN, &
E. F. WOODBURY.
Air-Engine.

No. 228,716. Patented June 8, 1880.

Witnesses:
E. A. Hemmenway
Walter C. Lombard

Inventors:
James A. Woodbury,
Joshua Merrill,
George Patten,
Edward F. Woodbury,
by N. C. Lombard Attorney

UNITED STATES PATENT OFFICE.

JAMES A. WOODBURY, JOSHUA MERRILL, GEORGE PATTEN, AND EDWARD F. WOODBURY, OF BOSTON, MASSACHUSETTS.

AIR-ENGINE.

SPECIFICATION forming part of Letters Patent No. 228,716, dated June 8, 1880.

Application filed December 31, 1879.

*To all whom it may concern:*

Be it known that we, JAMES A. WOODBURY, JOSHUA MERRILL, GEO. PATTEN, and EDWARD F. WOODBURY, all of Boston, in the county of Suffolk and State of Massachusetts, have invented certain new and useful Improvements in Air-Engines, of which the following, taken in connection with the accompanying drawings, is a specification.

Our invention relates to that class of air-engines which are operated by alternately heating and cooling the same body of air over and over again, and to that particular kind of such engines in which a working or power cylinder and piston are used in combination with a reverser-piston; and it consists in certain improvements in the construction and arrangements of the parts, which will be readily understood by reference to the description of the drawings to be hereinafter given, in which—

Figure 1:
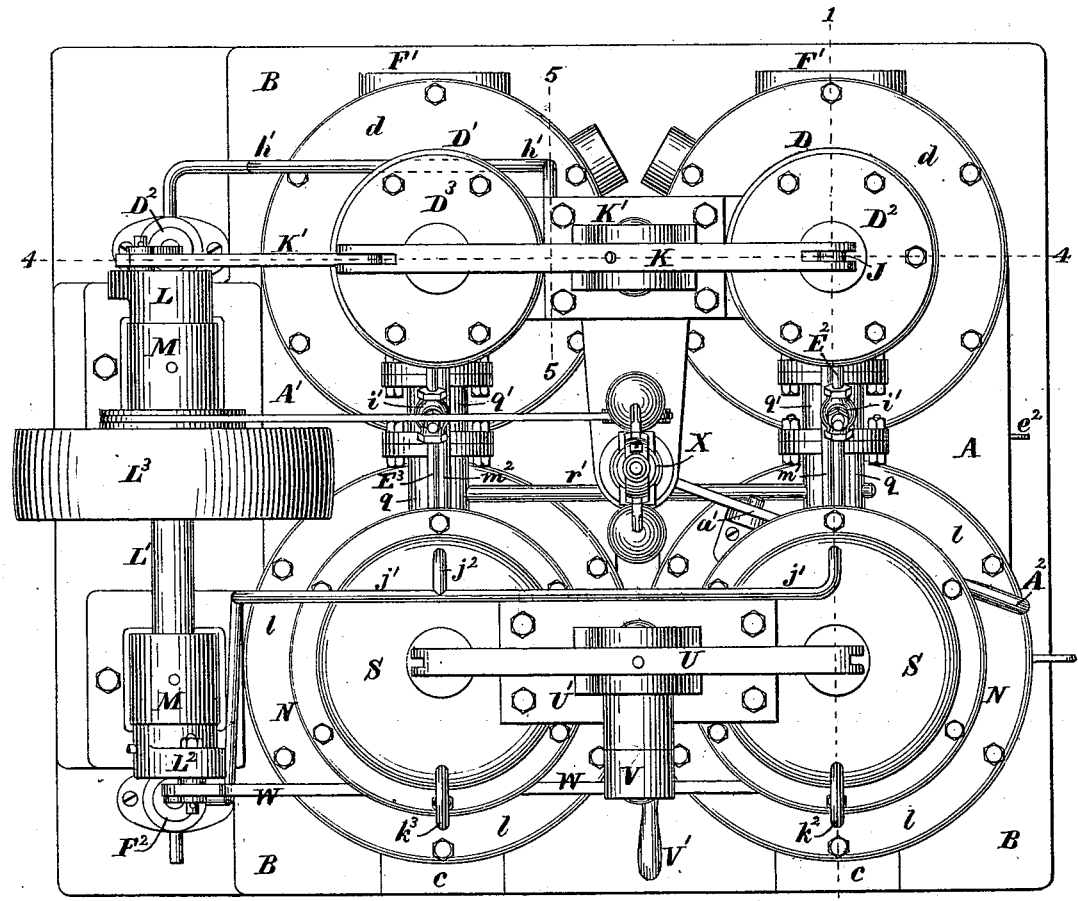
Figure 18:
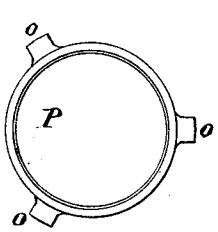
Figure 16:
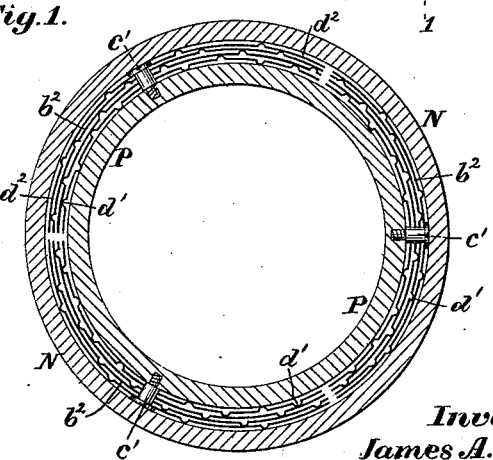
Figure 3:
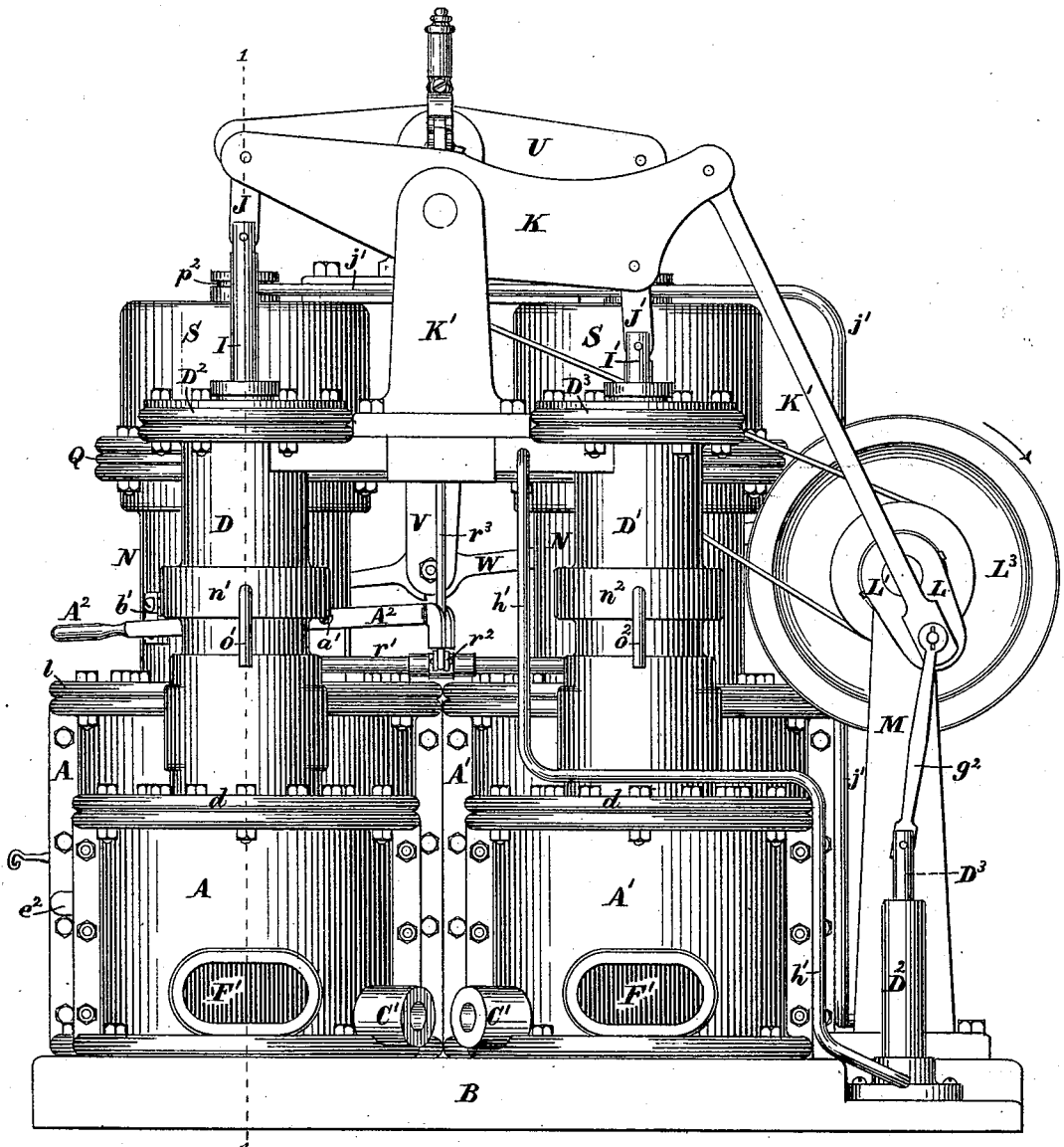
Figure 19:
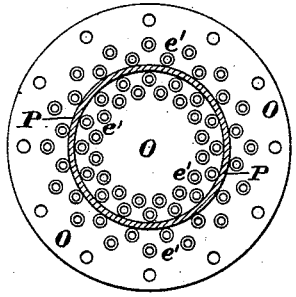
Figure 4:
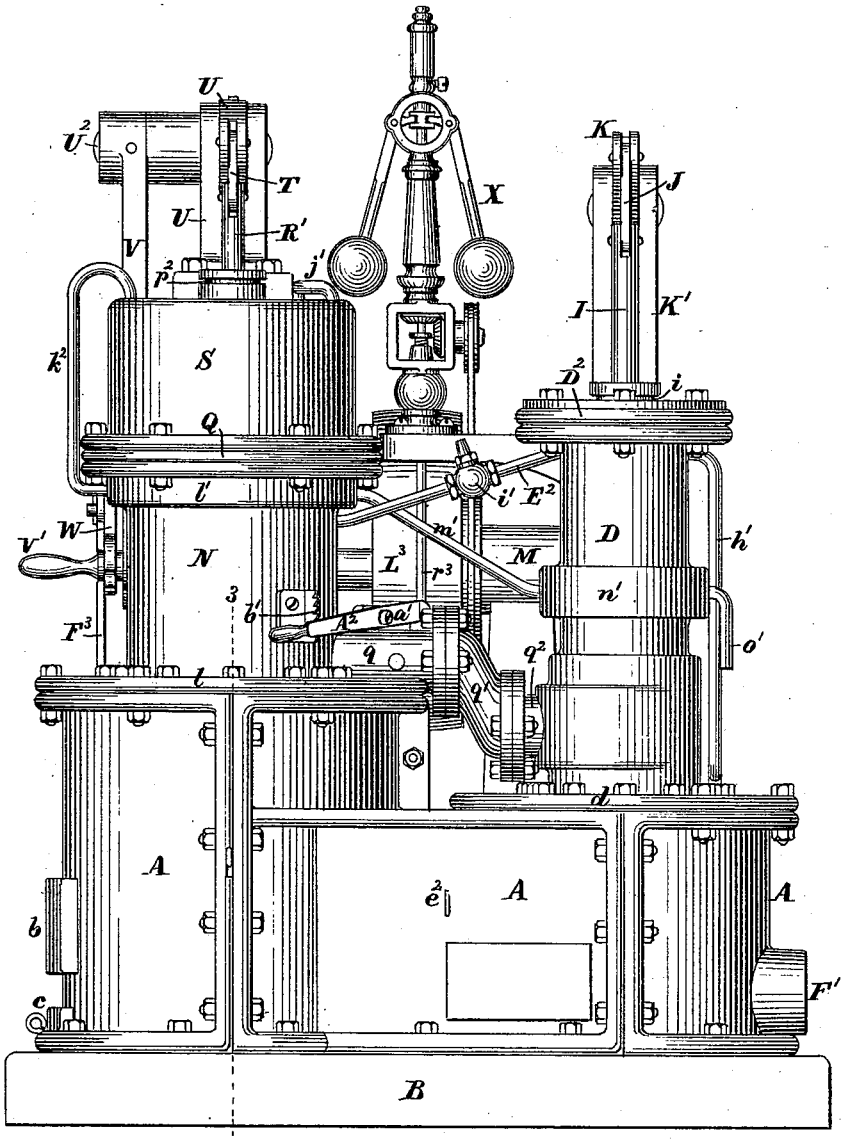
Figure 5:
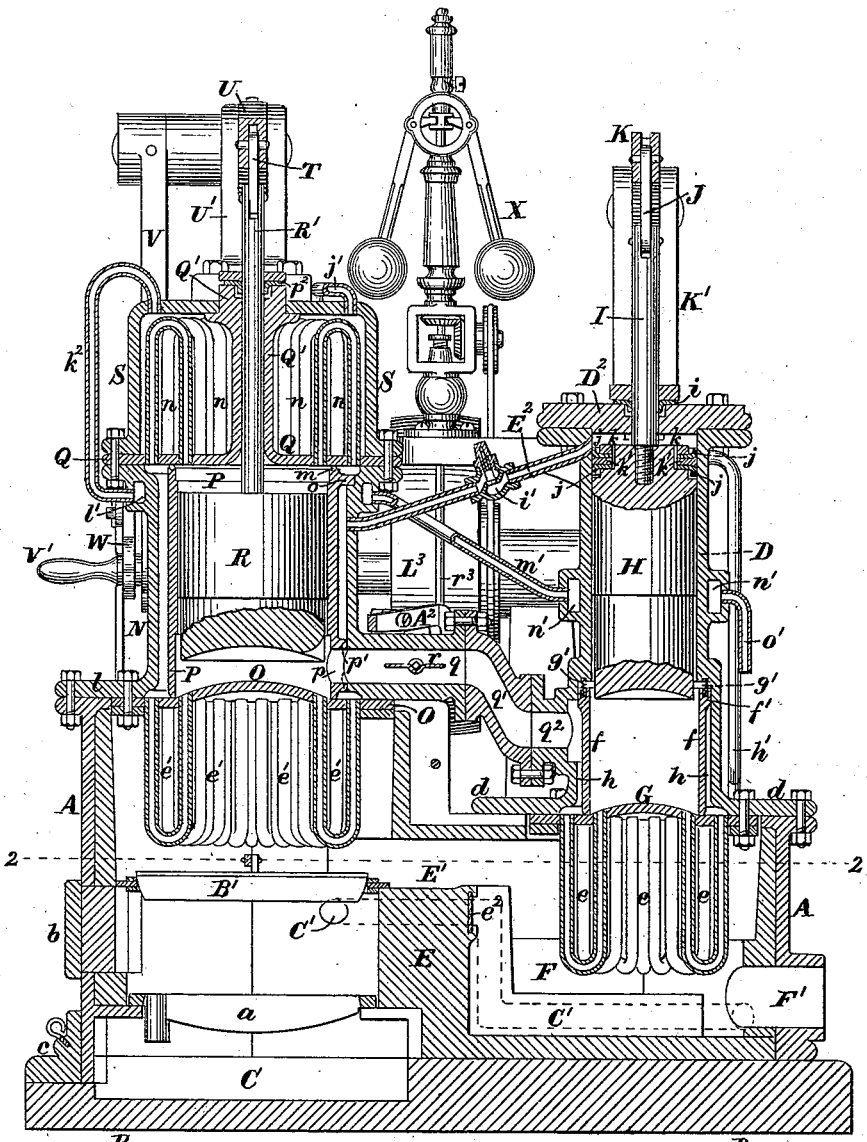
Figure 8:
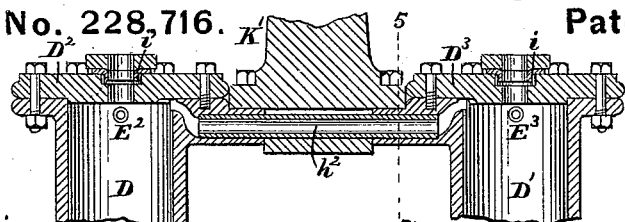
Figure 9:
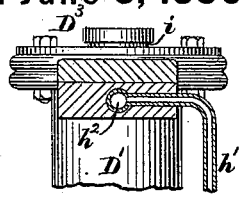
Figure 11:
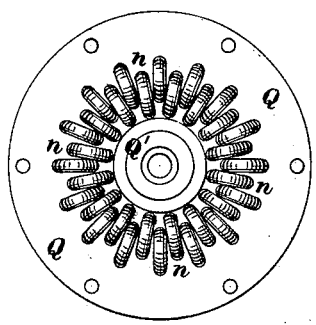
Figure 12:
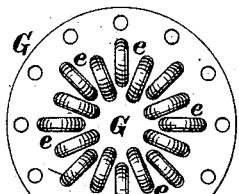
Figures 13, 14:
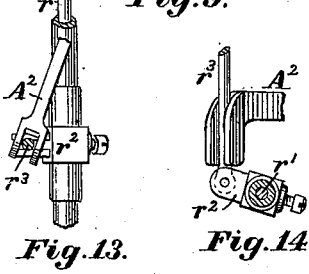
Figure 15:
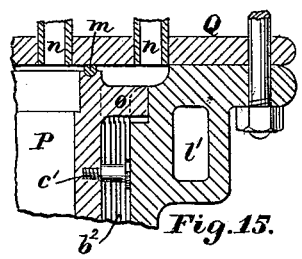
Figure 10:
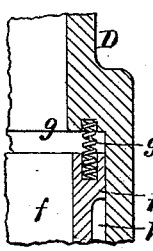
Figure 7:
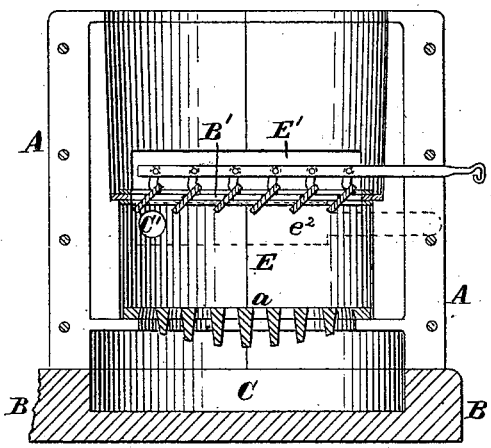
Figure 6:
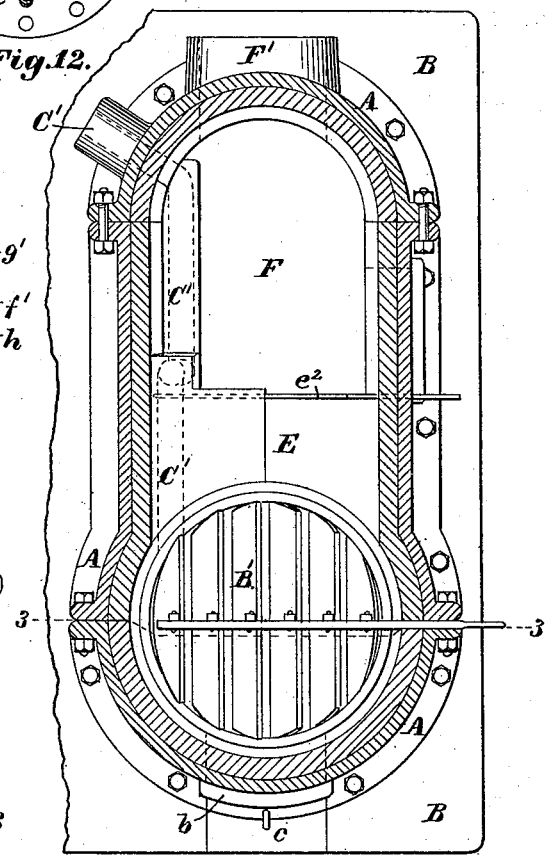

Figure 1 is a plan of an engine embodying our invention. Fig. 2 is a front elevation. Fig. 3 is a rear elevation. Fig. 4 is an end elevation. Fig. 5 is a vertical section on line 1 1 on Figs. 1 and 2. Fig. 6 is a horizontal section on line 2 2 on Fig. 5. Fig. 7 is a partial vertical section on line 3 3 on Figs. 4 and 6. Fig. 8 is a partial vertical section of the working-cylinders on line 4 4 on Fig. 1. Fig. 9 is a transverse section on line 5 5 on Figs. 1 and 8. Fig. 10 is a partial vertical section of the upper portion of the working-cylinder on line 1 1 on Fig. 1, enlarged. Fig. 11 is a plan of the cooler-pipes. Fig. 12 is an inverted plan of the heater-pipes of the working-cylinder. Figs. 13 and 14 are respectively a sectional plan and a sectional elevation of the devices for operating the throttle-valve. Fig. 15 is a partial vertical section of the reverser-cylinder enlarged. Fig. 16 is a horizontal section through the upper part of the reverser-cylinder, and showing the regenerator-plates. Fig. 17 is an elevation of the inner cylinder of the reverser with the regenerator-plates secured thereto. Fig. 18 is a plan of the inner cylinder of the reverser; and Fig. 19 is a plan of the lower head of the reverser-cylinder, with the inner cylinder shown in section.

In the drawings, A and A' are two fire-boxes or furnaces, mounted upon the bed-plate B, and provided with the grate $a$, ash-pit C, fire-door $b$, and ash-pit door $c$, all constructed in a well-known manner.

The fire-box casings A and A' extend to the rear of the combustion-chamber sufficiently far to serve as supports for the working-cylinders D and D', the rear portion being partially separated from the combustion-chamber by the bridge-wall E, above which the products of combustion pass through the flue E' across the chamber F, and thence escape into the chimney (not shown) through the passage F'.

The working-cylinders D and D' are cast open at both ends, and provided at their lower ends with broad flanges $d$, the outer portions of which rest upon and are securely bolted to the casings A and A', while to the inner portions of the same flange of each cylinder is firmly bolted the disk or circular plate-head G, in which are set both ends of a series of U-shaped pipes, $e\, e$, so arranged that the body of each of said pipes depends from said plate into the chamber F, and its two ends pass through the plate G at different distances from its center and the center or axis of the cylinder D or D'. The lower portion of each of the cylinders D and D' is made of somewhat greater diameter than the upper portion, and has fitted therein the short secondary cylinder or shield $f$, the lower end of which rests upon the plate G, while its upper end is provided with an outwardly-projecting narrow flange or band, $f'$, which fits the chambered portion of the cylinder D or D', said shield being made of such a length that its upper end does not quite reach the shoulder $g$ of the cylinder D or D', when its lower end rests on the plate G, to allow for unequal expansion, three or more coiled metal springs, $g'$, being inserted between said shoulder $g$ and the upper end of said shield, to insure contact between the lower end of said shield and the plate G, as shown.

Between the shield $f$ and its cylinder is an annular space, $h$, into which one end of each of the pipes $e\, e$ opens, while the other end of each of said pipes opens into the chamber beneath the piston H, the upper portion of which is fitted loosely to the upper portion of its cylinder, so as to be guided thereby in its upward and downward movements, while its lower portion is reduced in diameter, so as not to touch the cylinder, as shown in Fig. 5.

The upper ends of the cylinders D and D' are closed by the cylinder-heads $D^2$ and $D^3$, each provided with an opening for the passage of the piston-rod I or I' and a cupped packing-ring, $i$, to prevent the escape of air around said rod, the upper end of which is connected by the link J to one end of the beam K, or by the link J' to the opposite end of said beam, which is also connected by the rod K' to the crank L upon the driving-shaft L', mounted in bearings upon the standards M M, and having secured to its opposite end the crank $L^2$, and carrying the driving-pulley $L^3$, as shown.

The upper end of the piston H has mounted thereon two cupped leather packing-rings, $j\ j$, the inner edges of which are turned in opposite directions, said rings being firmly secured to the piston, so as to move with it, by means of the metal ring $k$, and their cupped edges are kept in proper position and shape by the metal ring $k'$, interposed between the two leather rings $j\ j$, in a well-known manner.

A metal packing may be used instead of the cupped leather rings, if desired.

The beam K has its bearing upon the stand K', supported by the cylinders D and D'; or said stand may extend downward to and be supported by the bed-plate B.

N N are two cylinders, each provided with a broad flange, $l$, at its lower end, the outer portion of which rests upon and is firmly bolted to the furnace-casing A or A' in a position directly above the grate $a$, and having its lower end closed by the disk or circular plate O, firmly bolted to the inner portions of the flange $l$, and having set therein a series of U-shaped pipes, $e'$, which depend therefrom into the combustion-chamber, and are arranged relative to each other and communicate through the plate O with two separate chambers, substantially as heretofore described in connection with the heater attached to the power-cylinder.

P is the reverser-cylinder, made of somewhat less diameter and placed within and concentric with the cylinder N, with its lower end resting on the plate O in such a manner as to form an annular chamber between the cylinders N and P, to serve as a regenerator.

The upper ends of the cylinders N and P are closed by the plate Q, which is firmly bolted to the cylinder N and rests upon a rubber packing-ring, $m$, placed in a groove in the upper end of the cylinder P, to form an air-tight joint and allow for unequal expansion.

The plate Q has set therein and projecting upward therefrom a series of pipes, $n$, bent into the form of an inverted U, one end of each of which communicates with the space between the cylinders N and P and the other end with the interior of the cylinder P above the reverser-piston R, and is also provided with the central upwardly-projecting tubular hub, Q', through which the piston-rod R' passes, and to the upper end of which is secured the upper end of the cooler-casing S, the lower end of which is firmly bolted through the plate Q to the cylinder N, thus forming a cooling-chamber inclosing the pipes $n$, to be filled with cold water, as will be hereinafter described.

The piston-rod R' is connected by the link T to one end of the beam U, having its bearings on the stand U', as shown, the opposite end of which beam is connected, by the link T' and piston-rod $R^2$, to the reverser-piston in the second reverser-cylinder, which is constructed in all respects like the one heretofore described.

The beam-center $U^2$ has firmly secured to its outer end the pendent arm V, provided with the handle V', by means of which the beam U and the reverser-pistons may be worked by hand to start the engine; or, by means of the hook connecting-rod W and the crank $L^2$, said beam and pistons may be worked by the power exerted by the working-pistons H, the hook end of the rod W engaging with the handle or pin V', as shown in Fig. 2.

The reverser-cylinder P has formed upon its upper end three or more outwardly-projecting lugs, $o\ o$, as shown in Fig. 18, which rest upon shoulders formed in the upper end of the cylinder N, to support said cylinder P when the heater-plate O is removed, and is provided near its lower end with a lateral opening, $p$, through an outwardly-projecting boss, $p'$, the outer end of which fits closely to the inner periphery of the cylinder N immediately around a corresponding opening through the pipe $q$, projecting horizontally from the rear of the cylinder N, through which and the pipes $q'$ and $q^2$ air may pass freely from the interior of the reverser-cylinder to the annular space $h$ in the working-cylinder, and thence through the pipes $e\ e$ to the space beneath the working-piston H, and vice versa when the throttle-valve $r$ is open.

A throttle-valve, $r$, is placed in each of the pipes $q$ and mounted upon opposite ends of a rocker-shaft, $r'$, extending from one pipe to the other, and having secured thereon a short lever, $r^2$, to the movable end of which the vertically-moving rod $r^3$ of the governor X is connected in such a manner that a radial movement of the governor-balls shall move both of said valves about their axes to open or close them, according as the speed of the engine is diminished or increased.

$A^2$ is a hand-lever, pivoted at $a'$ in such a position that its rear end may bear upon the movable end of the lever $r^2$ to depress it and close, or partially close, the throttle-valves $r$ when the front end of the lever $A^2$ is raised independently of the movements of the governor for the purpose of slowing the engine, the front end of said lever $A^2$ being retained in the desired elevated position by engagement with the ratchet-teeth $b'$. When the front end of the lever $A^2$ is depressed its rear end is so removed from the lever $r^2$ that it presents no obstacle to the free action of the governor upon the throttle-valve.

The space between the cylinders N and P is filled with a series of thin sheet-metal plates, $b^2$, attached to the outer surface of the cylinder P by means of screws $c'$ and $c^2$, the hole in said plates for the passage of one of said screws being slotted, as shown in Fig. 17, to allow for unequal expansion.

The plates $b^2$ are each provided with one or more vertically-arranged ribs or corrugations, $d'$, of slight projection, with broad plane surfaces $d^2$ at either side thereof, said ribs serving the purpose of keeping said plane surfaces from coming into close contact, and thus forming a series of very thin annular or segmental passages, through which the air is compelled to pass from the heater to reach the cooler, or vice versa, said plates being shown in Figs. 15, 16, and 17.

The U-shaped pipes $e$ and $e'$ of the heaters are secured into their respective plates G or O by brazing, and are plated with malleable nickel, which adheres firmly to the pipes when subjected to great heat, and renders them less liable to corrosion or deterioration under the action of the heat to which they are subjected, and at the same time the plating tends to close any pin-holes or any imperfect joints in the pipes or their connection with the plate or plates.

B' is a damper placed above the fire, between the grate $a$ and the heater O $e'$, and adapted to shut off communication between the fire on said grate and the heater O $e'$, to prevent unnecessary heating of the tubes $e'$ when the engine is not working, at which time the smoke and hot gases pass through the supplementary smoke-flue C', (shown partly in full lines and partly in dotted lines in Fig. 5, in full lines in Fig. 7, and in dotted lines in Fig. 6,) said flue C' being closed by the damper $e^2$ when the damper B' is open.

$D^2$ is an air-pump, provided with suitable valves and a plunger, $D^3$, to which a vertical reciprocation is given by means of the connecting-rod $g^2$ and the crank L, said pump being arranged and adapted to force air under pressure through the pipes $h'$ and $h^2$ into the working-cylinders D and D' above their pistons H.

$E^2$ and $E^3$ are pipes connecting the spaces in the working-cylinders D and D', above their respective pistons, with the regenerator-space in the reverser-cylinders N N, each pipe being provided with a check-valve, $i'$, to prevent the return of the air to the working-cylinders.

$F^2$ is a plunger circulating-pump, operated by the crank $L^2$ acting through the connecting-rod $F^3$, and adapted to force water through the pipes $j'$ and $j^2$ into the interior of the cooler-casings S S, thence through pipes $k^2$ and $k^3$ into the annular chambers $l'$ and $l^2$, surrounding the upper ends of the reverser-cylinders N N, to prevent the transmission of heat to the cooler Q $n$ S, and thence through pipes $m'$ and $m^2$ to the annular chambers $n'$ and $n^2$, surrounding the working-cylinders D and D', respectively, near the middle of their height, or at points below the lowest positions to which the packing-rings $j j$ on the upper ends of the pistons H descend, to prevent heating the upper portions of the cylinders D and D' to such an extent as to injure the packing $j j$, the water being finally discharged from the chambers $n'$ and $n^2$, through the pipes $o'$ and $o^2$, into any convenient receptacle. (Not shown.)

The piston-rod R' is packed by a cupped leather packing-ring, $p^2$, secured to the upper end of the hub Q' of the cylinder-head Q, as shown.

The heater and cooler pipes, instead of being bent to a U shape, may be straight pipes with their lower ends connected by half-turn junctions, or an annular pipe, if desired, without departing from the principles of our invention; but we prefer the U-shaped pipes as being the best construction, all things considered.

The operation of our invention is as follows: The cranks L and $L^2$ being set so that the crank $L^2$ leads the crank L in regard to the effect produced upon the respective pistons operated thereby from seventy to ninety degrees, supposing the crank-shaft to be revolved in the direction indicated by the arrow on Figs. 2 and 3, if a fire be built upon the grate $a$, so as to heat the air in the heater-pipes $e$ and $e'$ to start the engine, the operator disengages the hook-rod W from the pin V', and by means of said pin V' works the beam U by hand, and thereby moves the reverser-pistons alternately up and down in their respective cylinders, the effect of which is, that the pistons in the reverser-cylinders displace the air contained therein by driving the air in the cold end of one of said cylinders down through the tubes $n$ and the regenerator-space into the tubes $e'$, and driving the air in the hot end of the other reverser-cylinder through the tubes $e'$ and the regenerator-space into the tubes $n$, thereby greatly increasing the pressure in one reverser-cylinder and in the lower end of one working-cylinder, and correspondingly diminishing the pressure in the other reverser-cylinder and the lower end of the working-cylinder with which it communicates, while no change in the pressure above the working-pistons takes place, the effect of which is, that the increase of pressure beneath one of the working-pistons causes it to be moved upward till it reaches the extreme of its upward stroke, when the reverser-pistons are made to change their positions by hand, thereby diminishing the pressure beneath the working-piston which has just completed its upward stroke and increasing it beneath the one that has just completed its downward stroke, thus creating a differential pressure beneath the two working-pistons, by means of which the engine is set in motion, the pressure alternately changing from one cylinder to the other, when the hook W is allowed to engage with the pin V', and the reverser-pistons will then continue to be worked by the power of the working-pistons, and the air-pump and the water-circulating pump will be set in motion and made to perform their respective offices of forcing air into the upper ends of the working-cylinders under pressure and circulating cold water around and through certain parts of the engine to keep such parts cool.

As air is pumped into the engine the pressure is increased therein by compressing the air throughout all the air chambers and passages; but the air in the working-cylinders above their respective pistons, not being affected sensibly by the heat from the furnaces, remains substantially at its normal pressure, and as the two chambers above said pistons are connected by the pipe $h^2$, through which the air contained in said chambers may pass freely in either direction as one piston ascends and the other descends, and as the aggregate of the cubical contents of the two chambers is at all times substantially the same in whatever positions the pistons may be placed, it follows that there will be no material change in the pressure in said chambers, except such as is due to the compression of the air by pumping in more air, and this being understood, it will be equally clear that the power of the engine will be determined by the difference in the pressure alternately created in the reverser-cylinders by the movements of their pistons, heating the air in one reverser-cylinder and cooling it in the other, thereby at each stroke of the engine increasing the pressure beneath one working-piston and diminishing it beneath the other working-piston.

With the cranks adjusted to give the proper lead and the beams in the position shown in the drawings, the piston in the working-cylinder D will be at the extreme of its upward movement and the piston in the working-cylinder D' will be at the extreme of its downward movement, while the piston which works in the reverser-cylinder which is in direct communication with the lower end of the cylinder D has not quite reached the center of its downward stroke and the other reverser-piston has not quite reached the center of its upward stroke.

The downward stroke of the reverser-piston forces the hot air beneath it through the tubes $e'$, through the regenerator-space among the plates $b^2$, which extract a large proportion of the heat from the air as it passes, and through the tubes $n$, which are surrounded by cold water, as before described, into the space above said piston, thereby reducing the pressure beneath the piston of the working-cylinder which has just completed its upward stroke, while at the same time the other reverser-piston, by its upward motion, is forcing the cold air above it through the pipes $n$, through the regenerator, where it takes up a large amount of heat from the plates $b^2$, through the pipes $e'$, where it is heated, through the lower part of the cylinder P, pipes $q$, $q'$, $q^2$, and $e$, where it is still further heated and discharged into the space beneath the piston in the working-cylinder, to exert its power, due to the increase of pressure caused by the rise in temperature, upon said piston to move it upward. This operation is repeated as long as power is desired to be used, the increase of pressure and consequent development of power alternating from one working-cylinder to the other, each of said working-pistons being controlled by its own reverser-piston, as above described, and by the throttle-valve in the pipe $q$ and the governor connected therewith.

What we claim as new, and desire to secure by Letters Patent of the United States, is—

1. In an air-engine, a heater composed of a series of tubes open at both ends, communicating with the interior of the cylinder, and set in a position to be acted upon by the hot gases from the furnace or other means of applying heat, and through which air may be circulated by the movements of the reverser-piston, substantially as described.

2. In an air-engine to be operated by alternately heating and cooling the same body of air, a cooler composed of a series of tubes open at both ends, communicating with the interior of the cylinder, and through which air may be circulated by the movements of the reverser-piston, in combination with an inclosing casing surrounding said tubes and adapted to be filled with water, substantially as described.

3. In an air-engine to be operated by alternately heating and cooling the same body of air, a heater and cooler, each composed of a series of tubes open at both ends, communicating with the interior of the cylinder, in combination with a reverser-piston adapted to move the air through said tubes, substantially as described.

4. In an engine to be operated by alternately heating and cooling the same body of air, a heater or cooler, one or both composed of a series of U-shaped tubes, both ends of each of which are set in and communicate through the cylinder head or heads, substantially as described.

5. In an air-engine, the combination of the cylinders N and P, arranged one within the other, with an annular space between them, and having their ends closed by suitable heads, a heater or cooler, one or both composed of a series of U-shaped tubes set in said head or heads, when one end of each of said tubes communicates with the interior of the cylinder P and the other end of each of said tubes communicates with the annular space between said cylinders, and a reverser-piston adapted to move the air alternately in opposite directions through said tubes, substantially as described.

6. The cylinder N, closed at its two ends by the heads O and Q, in combination with the inner cylinder, P, resting upon the head O, and pressed thereto by a spring or elastic material, $m$, placed between its upper end and the head Q, substantially as described.

7. In combination with the cylinder N, closed at its ends by the heads O and Q, the cylinder P, made slightly shorter than the cylinder N, and placed therein and concentric therewith, and a packing of rubber or other suitable elastic material placed between the upper end of said cylinder P and the under side of the plate or head Q, and resting in an annular groove formed in the upper end of said cylinder P, substantially as described.

8. In combination with a working-cylinder and a reverser composed of two cylinders placed one within the other, with an annular space between them, a pipe or passage leading from the interior of the inner reverser-cylinder to the interior of the working-cylinder, substantially as and for the purposes described.

9. In combination with a working-cylinder and a reverser composed of two cylinders placed one within the other, with an annular space between them, the short pipe $p\ p'$, bridging the annular space between the two cylinders, and a pipe leading therefrom to the working-cylinder, substantially as described.

10. In an air-engine, the combination of a working-cylinder and a reverser-cylinder connected by a pipe, for the passage of air from one to the other, a throttle-valve placed in said pipe, and a governor connected to and adapted to move said throttle-valve to control the speed of the engine, all arranged for operation substantially as described.

11. In combination with a working or power cylinder and a reverser-cylinder, connected by an air-passage, a throttle-valve placed in said passage, a governor connected with and adapted to operate said throttle, and a hand-lever adapted to close said throttle against the resistance of the governor, substantially as described.

12. In an air-engine having two working-cylinders and two reversers arranged in pairs, two throttle-valves placed upon the same shaft, and a governor connected to and adapted to partially rotate said shaft, and thus open or close both of said throttle-valves at the same time, substantially as described.

13. In combination with a working-cylinder chambered at its lower end, the shield $f$, fitted to said cylinder, with an annular space between it and the chambered portion of said cylinder, and supported upon the cylinder-head G, substantially as described.

14. The combination of the working-cylinder D or D', chambered as set forth, and provided with the head G, the shield or inner cylinder, $f$, fitted thereto, with an annular space between it and the chambered portion of the cylinder, and the springs $g'$, all arranged and adapted to operate substantially as and for the purposes described.

15. In a hot-air engine, the combination of a working-cylinder, a long piston adapted to be worked under pressure upon both sides thereof, and a packing ring or rings secured to and moving with said piston and adapted to resist the pressure in both directions, substantially as described.

16. The regenerator-plates $b^2$, provided with slightly-projecting vertical ribs or corrugations, with broad plane surfaces between them, when used in combination with the cylinders N and P and air heating and cooling devices, substantially as described.

17. In combination with the cylinders N and P, arranged as set forth, the regenerator-plates $b^2$, secured to the exterior of the cylinder P, substantially as described.

18. In an air-engine, the damper B', placed between the grate and the tubular heater, and adapted to shut off the passage of the hot gases to said tubular heater, substantially as described.

19. In combination with a furnace having set in its upper part an air-heater, and provided with a damper placed between the fire and said heater and the main smoke-flue, a supplementary flue, opening from said furnace below said damper, substantially as and for the purposes described.

20. In combination with a reverser-cylinder provided with an annular regenerator and a refrigerator, a heater provided with a series of passages leading from the heated end of the reverser-cylinder to the regenerator, and adapted to subdivide the column of air moved by the reverser-piston into a series of smaller columns, substantially as described.

Executed at Boston, Massachusetts, this 15th day of December, A. D. 1879.

JAMES A. WOODBURY.
JOSHUA MERRILL.
GEORGE PATTEN.
EDWARD F. WOODBURY.

Witnesses:
C. H. DODD,
W. E. LOMBARD.